United States Patent [19]
Padhi

[11] Patent Number: 5,319,554
[45] Date of Patent: Jun. 7, 1994

[54] METHOD FOR DATA INTERPOLATION AND SIGNAL ENHANCEMENT

[75] Inventor: Trilochan Padhi, Houston, Tex.

[73] Assignee: Shell Oil Company, Houston, Tex.

[21] Appl. No.: 753,257

[22] Filed: Aug. 30, 1991

[51] Int. Cl.$^5$ .......................... G01V 1/28; G01V 1/34
[52] U.S. Cl. .................... 364/421; 364/577; 364/582; 367/21; 367/38; 367/73
[58] Field of Search .............. 364/485, 486, 487, 577, 364/573, 575, 581, 582, 421; 367/38, 53, 63, 21, 73

[56] References Cited

U.S. PATENT DOCUMENTS

| | | | |
|---|---|---|---|
| 4,570,246 | 2/1986 | Herkenhoff et al. | 367/68 |
| 4,573,148 | 2/1986 | Herkenhoff et al. | 367/46 |
| 4,594,693 | 6/1986 | Pann et al. | 367/43 |
| 4,860,265 | 8/1989 | Laster et al. | 367/73 |
| 4,887,244 | 12/1989 | Willis et al. | 367/73 |
| 4,922,465 | 5/1990 | Pieprzak et al. | 367/38 |
| 4,964,098 | 10/1990 | Hornbostel | 367/73 |

FOREIGN PATENT DOCUMENTS 932443  8/1973  Canada ............................. 364/421

OTHER PUBLICATIONS

"Seismic Data Processing, Investigations in Geophysics No. 2," by Ozdogan Yilmaz, Society of Exploration Geophysicists, 1987, pp. 169-182.

Primary Examiner—Jack B. Harvey
Assistant Examiner—Melanie A. Kemper
Attorney, Agent, or Firm—Fred S. Reynolds

[57] ABSTRACT

The method sequentially determines dips and corresponding estimated dip components of traces in a panel of data. The method can be applied to any data which can be represented as a function of two coordinates. In particular, the method can be applied to seismic data traces. The method in one embodiment sums data on traces along a preselected range of trial dips on a panel of data. The energy of the summed data with their corresponding trial dip are then displayed. The dip which has the peak of maximum energy on the display is then selected as a valid dip. An estimated dip component of the selected dip is then determined and subtracted from the traces along the selected dip. The process is then repeated, sequentially, determining a dip and an estimated dip component from the panel of data until the desired number of dips and estimated dip components are determined or the residual energy of the remaining data on the traces are below a preselected value. After the dips and estimated dip components are determined from the panel of data, the information can then be used to place an interpolated trace within the panel of data, to create a new panel of data having uniform spacing between the traces if the original panel of data had some non-uniform spacing, and/or to enhance the traces by creating a new panel of data having only the determined dips and estimated dip components thereby removing from the data panel randomly distributed noise.

32 Claims, 5 Drawing Sheets

METHOD FOR DATA INTERPOLATION AND SIGNAL ENHANCEMENT

BACKGROUND OF THE INVENTION

1. Field of the Invention

This invention relates to a method of interpolation and/or enhancement of data that is a function of two coordinates and more particularly to a method of interpolation and/or enhancement of seismic data traces.

2. Description of the Related Art

Certain forms of data may be represented as multiple data samples in two dimensions. Such a collection of data samples may be referred to as a panel of data.

This invention provides a solution to two related problems. In one, the separate data samples (signals) may not be frequent or regular enough, in either or both coordinates, to enable an interpreter of that data to perform higher levels of processing due to spatial aliasing. In the second, noise in the data samples may mask the information the interpreter is analyzing.

In interpreting and processing data recorded on seismic traces it is preferable that the traces be evenly spaced, sufficiently close together and free of noise. However, in the acquisition of seismic data it may not be possible to meet these criteria due to surface obstacles, cost or equipment failure. Missing traces must then be interpolated and/or various processing techniques used to reduce the noise.

Interpolation methods generally attempt to estimate a new trace by connecting the troughs and peaks representing reflected arrivals in recorded traces along a dip. A dip can be considered to be in this case a rate of change in time of arrival per trace or the slope of a straight line connecting the reflected arrivals on a panel of data. These methods typically examine the recorded traces along a preselected number of trial dips in order to determine the correct dip of the reflected arrivals. From this, a reflected arrival can be estmated for or assigned to the interpolated trace. Alternatively, interpolated traces may be generated by inserting zero traces at the interpolation locations followed by the use of an appropriate spatial filter. However, this alternate approach requires that the dips be approximately known and not aliased with respect to each other.

These methods are insufficient in determining an interpolated trace in the presence of multiple dips and spatial aliasing in the recorded traces. Spatial aliasing is defined as the condition where a dip is so great and the trace spacing so large that it is not possible to unambiguously correlate the peaks and troughs in successive recorded traces. This usually occurs when the peaks and/or troughs on successive traces are at least one-half cycle out of phase. These methods may also fail when the recorded traces exhibit a plurality of widely different dips because of an inability to adequately separate the reflected arrivals.

In addition, many of these methods fail to provide a technique which can be used to enhance the data by selectively using arrivals on traces which have a corresponding arrival on adjacent traces that are related by a dip thereby removing noise from the traces.

SUMMARY OF THE INVENTION

The method of this invention sequentially determines dips and corresponding estimated dip components of traces displayed as a panel of data. The method can be applied to any data which can be represented as a function of two coordinates.

The method of this invention selects a most valid dip by various techniques of evaluating panels of data to determine possible valid dips. After a most valid dip is found a corresponding estimated dip component is determined. The estimated dip component is then subtracted from the panel of data along the selected dip resulting in a new panel of data. The new panel of data is again evaluated for possible valid dips. The process is repeated until the new panels of data no longer contain any possible valid dips or a preselected number of selected dips and estimated dip components are determined.

The method of this invention in one embodiment sums the data on traces from a panel of data along a preselected set of trial dips. The energy of the summed data with their corresponding trial dip are then determined. The trial dip which has the peak of maximum energy is then selected as a valid dip. In an embodiment of this invention the selection of the selected dip is aided by the use of a display of the energy of trial dips versus energy of the summed data. An estimated dip component of the selected trial dip is then determined and subtracted from the traces along the selected trial dip. The process is then repeated, sequentially, determining a dip and an estimated dip component from the panel of data until the desired number of dips and estimated dip components are determined or the residual energy of the remaining data on the traces fall below a preselected value.

After the selected dips and estimated dip components are determined from a panel of data, the information is then used to place an interpolated trace within the panel of data, to create a new panel of data having uniform spacing between the traces if the original panel of data had some non-uniform spacing, and/or to enhance the traces by creating a new panel of data having only the determined dips and estimated dip components thereby reducing randomly distributed noise from the data panel.

These and other objects and advantages of the present invention will become apparent to those of skill in the art after having read the following detailed description of the preferred embodiments which are contained herein and illustrated by the various figures.

The invention encompasses the heretofore described embodiments as well as other embodiments as are described hereinafter and as will be apparent to those of skill in the art.

DESCRIPTION OF EMBODIMENTS

The embodiments of this invention will be described in relation to "seismic" traces. However, the method of this invention is not limited to "seismic" traces. It can also be applied to any data, i.e. signals, which can be represented as a function of two coordinates.

This invention is a method of interpolation and/or trace enhancement of data that is a function of two coordinates. Preferably the data available is finely sampled in one coordinate, but not necessarily finely sampled in the other coordinate.

Figure 1:
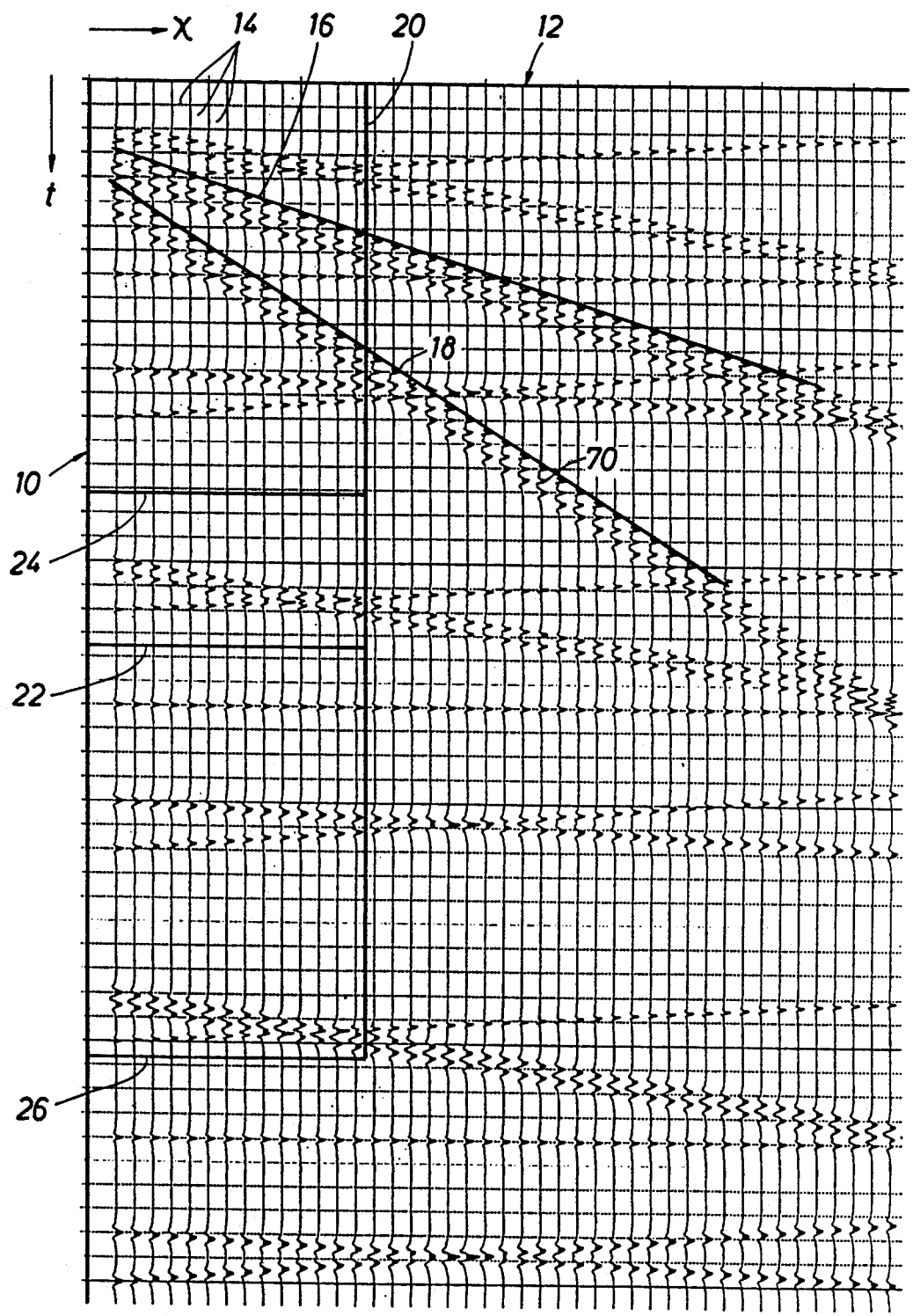
FIG. 1 is a synthetic panel of traces.

FIG. 1 shows a panel of traces. The panel is two dimensional and for convenience, the finely sampled coordinate 10 will be referred to as the time axis or "t" axis and the other coordinate 12 as the "x" axis. The data samples, which are located at any one of the fixed values of x, will be referred to as a trace 14. The term "dip" in the description of these embodiments means the slope of a straight line drawn through coordinate space, 16 and 18 as examples.

The method of the invention can be practiced on the entire panel. However, in a preferred embodiment of this invention, the entire panel is divided into overlapping sub-panels. In the art, these sub-panels are also referred to as a spatio-temporal gates. The boundaries of one sub-panel are shown in FIG. 1 as bounded by line 10 on the left and the line 20 intersecting the "x" axis on the right and by line 12 and the line 22 intersecting the time axis. An additional sub-panel is also shown, overlapping the first sub-panel. The second sub-panel is bounded by line 10 on the left and the line 20 on the right and by the lines 24 and 26 intersecting the time axis.

The size of the sub-panels and amount of overlap are determined by the user of this invention. Preferably, but not necessarily, the criterion for the size of a sub-panel is that the data within any sub-panel should consist of one or more approximately linearly dipping bands of energy.

In a preferred embodiment the sub-panels overlap, the overlap is used to blend the results of applying the invention to adjacent sub-panels to eliminate the formation of visible seams at sub-panel boundaries.

Figure 2:
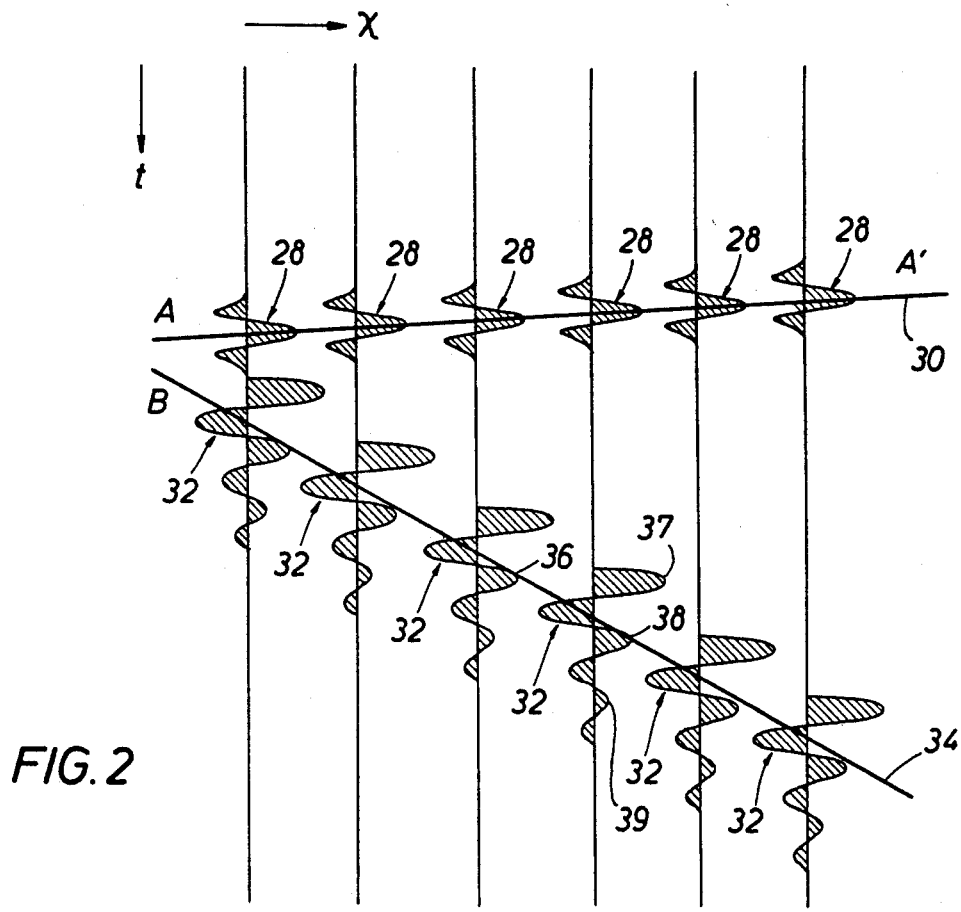
FIG. 2 is a sub-panel of portions of traces.

FIG. 2 illustrates a sub-panel of data with two bands of dip components evident, one group of dip components, 28, denoted by AA' that rises to the right (dip 1, 30), and the other group of dip components, 32, denoted by BB' which falls to the right (dip 2, 34). Scrutiny of the latter band, BB', will show that portions of the dip components of BB' could also at least locally, i.e., within the sub-panel, be interpreted as a nearly horizontal band instead of one dipping strongly to the right. This phenomenon arises because a peak, for example peak 36, on one trace can be associated with any one of the peaks, for example peaks 37, 38 or 39, of a neighboring trace to create a possibly incorrect impression of the dip present. This illustrates the phenomenon of spatial aliasing, well known in the art. Also well known in the art is the fact that if the trace spacing were finer, the likelihood of mistakenly measuring an incorrect dip due to spatial aliasing is reduced.

This invention is able to correctly interpolate traces that lie anywhere between the given traces, i.e. recorded traces, even when the original trace spacing is wide enough that spatial aliasing could arise.

It is well known in the art that if the data on the traces consists of a known number (N) of dips, which we will designate as $P_i$ with $i=1, 2,$ or $3,$ etc up to $N$, and if with each dip $P_i$ is a known function of time, $S_i\{t\}$ called the dip component associated with the dip $P_i$ at some trace position X, the data on a trace at any position x can be reconstructed or interpolated with the formula $$D(t,x) = \sum_{i=1}^{N} S_i\{t - (x - X)P_i\}. \tag{1}$$

Here and below the shifting of the traces in the time dimension can be done by any of the methods well known in the art applicable to the case where the trace is finely sampled.

In embodiments of this invention, the dips and the dip components in each sub-panel are estimated and the above formula is used to reconstruct the data at any position within the sub-panel or panel of data.

The method of this invention determines each dip and dip component sequentially. It is assumed that the user of this invention has knowledge of the range of dips which exist in the data.

There are many methods known in the art for evaluating a panel of data (traces) to determine possible valid dips and select the "most" valid dip or dips. One method used in a preferred embodiment for evaluating dips finds the first most valid dip in the following way:

Form the sum $$R_k\{t\} = \sum_{j=1}^{M} D_j\{t + (x_j - X)p_k\} W_j \tag{2}$$

for a preselected set of dips ($p_k$) within the known range of dips on the data.

In the above formula, the index j runs over all the traces $D_j\{t\}$ in the sub-panel of a preferred embodiment having M traces located at $x_j$ respectively. $W_j$ is a weighting factor that tapers gradually towards zero at the edges of the sub-panel.

$R_k\{t\}$ is determined for a preselected set of dips ($p_k$).

Figure 3:
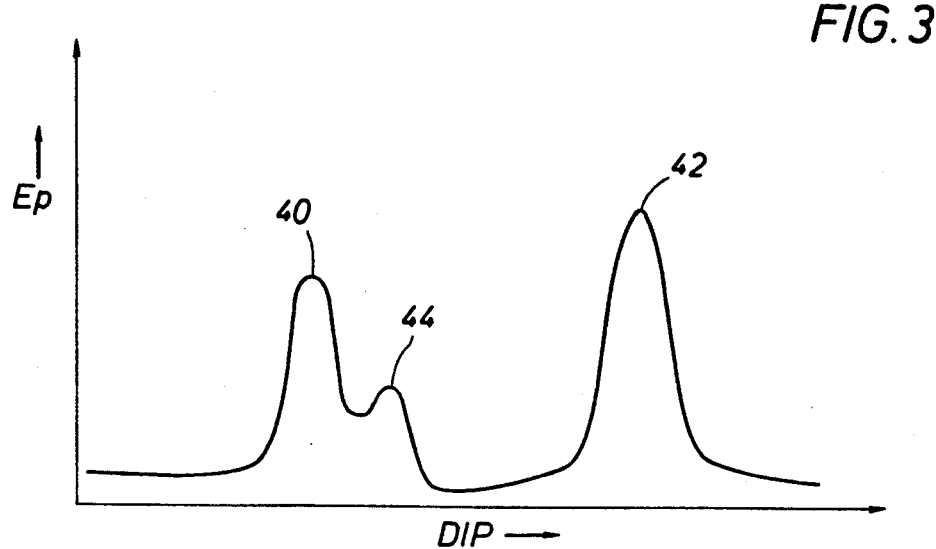
FIG. 3 is a display of the energy of the dip components in relation to their dips for the portions of traces in FIG. 2.

The energy, $E_p$ in $R_k\{t\}$ associated with each trial dip p of the preselected set of dips is then computed using a suitable temporal window function, for example a Hanning taper, as is known in the art. Each $E_p$ determined for each $p_k$ from $R_k\{t\}$ in equation (2) may then be displayed as shown in FIG. 3 which shows the magnitude of $E_p$ on one axis and the dip ($p_k$) for each $E_p$ on the other axis. Peaks on the display in FIG. 3 will generally be evident at positions corresponding to dips actually present on the data as shown by peak 40 which corresponds to dip 1 and peak 42 which corresponds to dip 2. Also present, however, will be spurious peaks 44 which corresponds in this case to the spatial aliasing of dip 2 as discussed previously with respect to FIG. 2.

The method of this embodiment uses the largest peak of $E_p$ to identify a most valid dip. This takes into consideration that the $E_p$ with the maximum energy is more likely to be a valid dip which is free of spatial aliasing. From FIG. 3, the $E_p$ representing dip 2 has the largest peak. The value of the dip for dip 2 is selected for a most valid dip.

Figure 5:
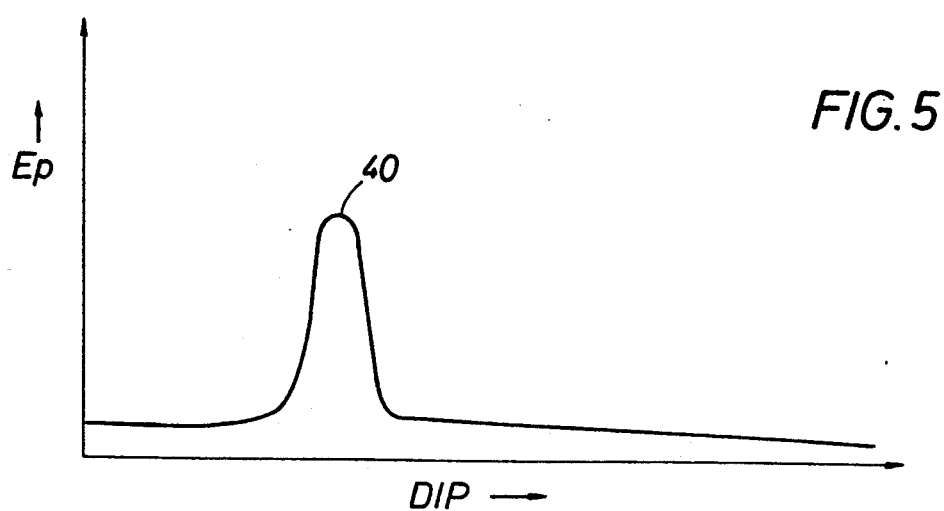
FIG. 5 is a display of the energy of the dip component in relation to their dip for the portions of traces in FIG. 4.

FIG. 3 and FIG. 5 (hereinafter described) are illustrated as a continuous curve for illustration purposes with this specification. However, in an actual reduction to practice the value of $E_p$ and dip will be discrete values with a corresponding value of $E_p$ for each dip from the preselected set of dips. In such a case, any one of the interpolation methods well known in the art may be used to find the largest peak of $E_p$ and its dip. In practicing this embodiment, the preselected dips should be spaced closely enough to ensure that no peak is missed of $E_p$. The width of the peaks on FIG. 3 are readily determined from the frequency of the data and the size of the sub-panel by one skilled in the art. It should also be noted that in some embodiments interpolation is not necessary, especially if the number of preselected dips used is large. In this case the largest value of $E_p$ determined yields the selected dip. It should further be noted that in some embodiments that the display of $E_p$ versus dip is not necessary to practice this invention since the determination of maximum energy or other methods (to be discussed hereinafter) can be processed without the aid of a display.

As mentioned, there are other methods well known in the art which may be used alone or in combination to evaluate dips in a panel of data and determine the most valid dip or dips. Some other methods to measure size besides the energy of $R_k\{t\}$ include using average absolute values or peak absolute values for $E_p$. In addition, measures of coherence such as semblance could be used in place of $E_p$ to determine the most valid dip.

After the first valid dip is found, the value of the first selected dip is designated as $P_1$. The estimated dip component $S_1\{t\}$ is then determined by substituting $P_1$ in the formula for $R_k\{t\}$ given in equation (2).

$$S_1\{t\} = \sum_{j=1}^{M} D_j\{t + (x_j - X)P_1\}W_j/A \qquad (3)$$

with an extra normalizing factor A given by $$A = \sum_{j=1}^{M} W_j \qquad (4)$$

To find the next dip and estimated dip component, a new sub-panel is formed from the original traces in the sub-panel by subtracting out the estimated dip component from the original traces. Denoting the traces in the new sub-panel by $\overline{D}\{t\}$, the formula used to compute these traces is $$\overline{D_j\{t\}} = D_j\{t\} - S_1\{t - (x_j - X)P_1\} \qquad (5)$$

Figure 4:
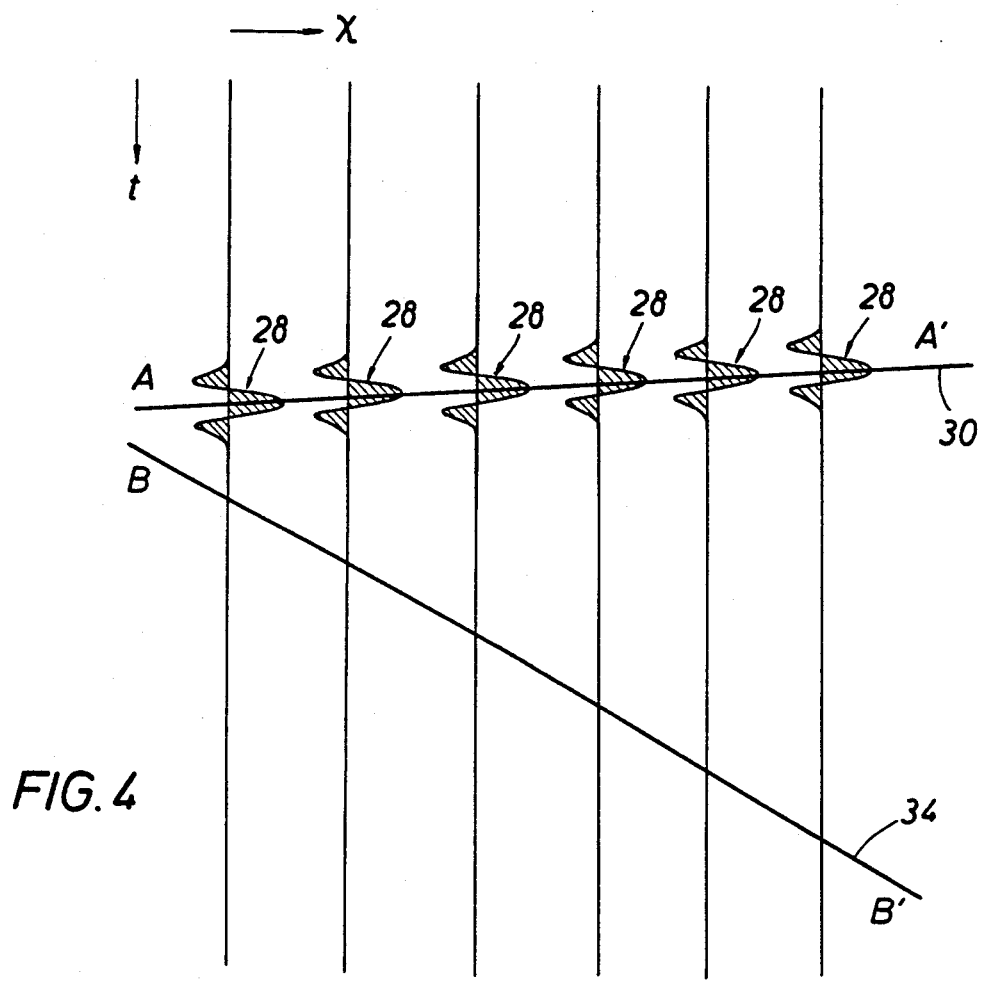
FIG. 4 is the sub-panel of FIG. 2 after the estimated dip component of the dip having the greatest energy has been removed from the portions of traces in the sub-panel.

After subtracting the estimated dip component associated with dip 2 in this case, the new sub-panel will have a display similar to the display shown in FIG. 4. Note that the energy train along BB' has been removed.

In a preferred embodiment, Formula (2) is then used on the new sub-panel to sum the data along trial dips so that a display of $E_p$ versus dip for the second biggest dip component can be obtained. A display of $E_p$ values determined for the new sub-panel is shown in FIG. 5 where the $E_p$, 44, associated with dip 1 displays the maximum energy. Note that in FIG. 5, the peak of spatial aliasing energy shown as 44 on FIG. 3 is missing, as is also the peak shown as 42 on FIG. 3 which corresponds to the first estimated dip subtracted from the sub-panel.

Other methods as described previously could be used to determine the second most valid dip and subsequent dips than as described in the before-mentioned preferred embodiment. However, alternate methods of evaluating dips will be limited to selecting the most "valid" dip from the values obtained by that method. The selected dip by the alternate method will then be used to determine an estimated dip component in accordance with equation (3).

The method of this invention in removing stronger dip components along with their aliases sequentially from a sub-panel allows this invention to detect weak dips and dip components with little contamination from the stronger dips and dip components present in the data.

The process used to determine the two strongest dips present in the sub-panel has been described. The process can be iterated indefinitely to include any or all of the dips present in the sub-panel, at each iteration forming a new sub-panel by removing the dip component found in the previous iteration.

Figure 6:
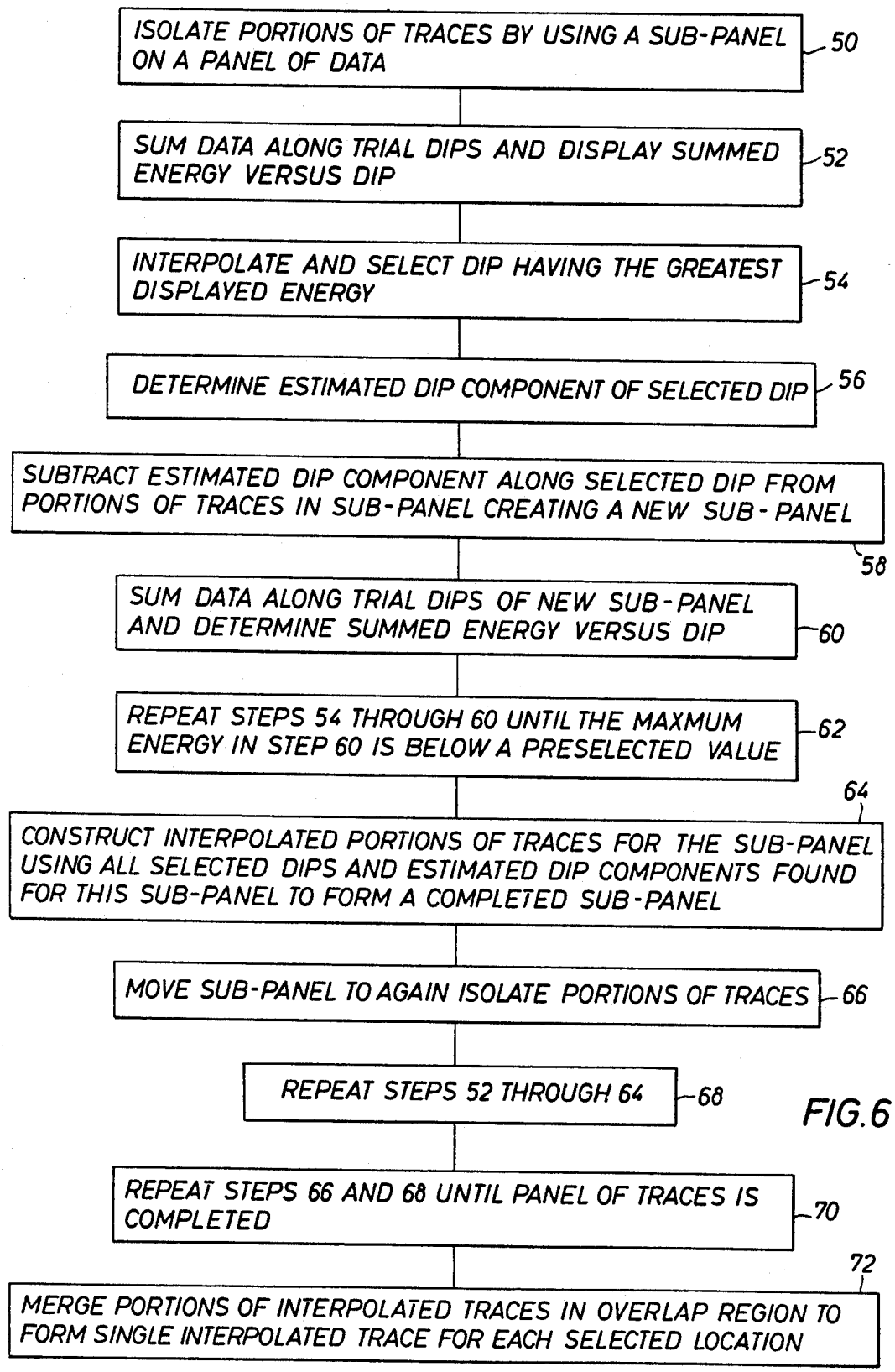
FIG. 6 is a block diagram of the steps of the method in one preferred embodiment of this invention.

FIG. 6 is a diagram of the steps used in one preferred embodiment to interpolate traces using the method of this invention. In the first step, in a preferred embodiment, portions of traces on the panel are isolated by the boundaries of a sub-panel. The dimensions of the sub-panel are user specified. It should be noted, that the use of a sub-panel is not necessary to practice the method of this invention, but it could result in a better utilization of processing time in applying this invention. The next step, 52, is to sum data on traces along dips within the sub-panel using equation (2) over a preselected range of dips (trial dips), to determine an estimated $E_p$ by a suitable tapered window function and to display the summed energy ($E_p$) versus dip (p). The dip with the maximum $E_p$ is then interpolated, selected, and saved, 54. An estimated dip component for the selected dip is then determined using equation (3) and saved, 56. A new sub-panel is created by subtracting the estimated dip component from the traces in the previous sub-panel using equation (5), 58. The data on the new panel is summed along the preselected range of dips (trial dips), step 60. Steps 54 through 60 are repeated forming a plurality of selected dips and estimated dip components until the maximum energy of $E_p$ is below a preselected value, 62. As an alternative to this step, the user could specify a preselected number of selected dips and estimated dip components to determine, instead of stopping the process based upon the remaining energy of $E_p$.

Interpolated portions of traces for the sub-panel are formed using formula (1) step 64. The saved values for the estimated dip components are substituted into the formula for $S_i$ and the saved selected dips are substituted into the formula for $P_i$. The user specifies where on the "x" axis the portions of interpolated trace(s) is (are) to be inserted on the original sub-panel of data. The estimated dip components are then placed on the portions of interpolated trace(s) where the selected dips with their corresponding estimated dip components cross the "t" axis along the selected "x" location forming a completed sub-panel which replaces the portions of traces of the sub-panel of step 52 on the panel of traces.

In addition, it is possible for the user using the method of this invention to also replace the original traces in the sub-panel by traces computed for those locations or any location using formula (1) as will be described hereinafter.

After step 64, the sub-panel boundaries are moved to again isolate portions of traces from the panel of traces, 66. In this embodiment the boundaries of the new location of the sub-panel could be moved at random. However, when the boundaries of the sub-panel are positioned to overlap previously completed sub-panels an overlap region is formed. The overlap region is composed of shared portions of traces between the present sub-panel and any previously completed sub-panels. Any interpolated portions of traces which are created within this region are identified for later processing. Steps 52 through 64 are repeated at the new sub-panel location, 68.

Returning to FIG. 6, steps 66 through 68 are repeated until the panel of traces is processed, 70.

In this embodiment of FIG. 6, the sub-panels overlap and more preferably the entire panel is processed by overlapping sub-panels. When overlapping is used, the portions of interpolated trace(s) in the overlap regions are merged using weighting factors well known in the art so that only one interpolated trace is formed for each selected interpolation location, step 72. This step looks at all previous overlap regions involving each interpolated trace. However, the method of this invention can be used without overlapping and and, if only portions of traces are to be interpolated, then the sub-panels only need to process those portions of original (recorded) traces that are to be interpolated.

Figure 7:
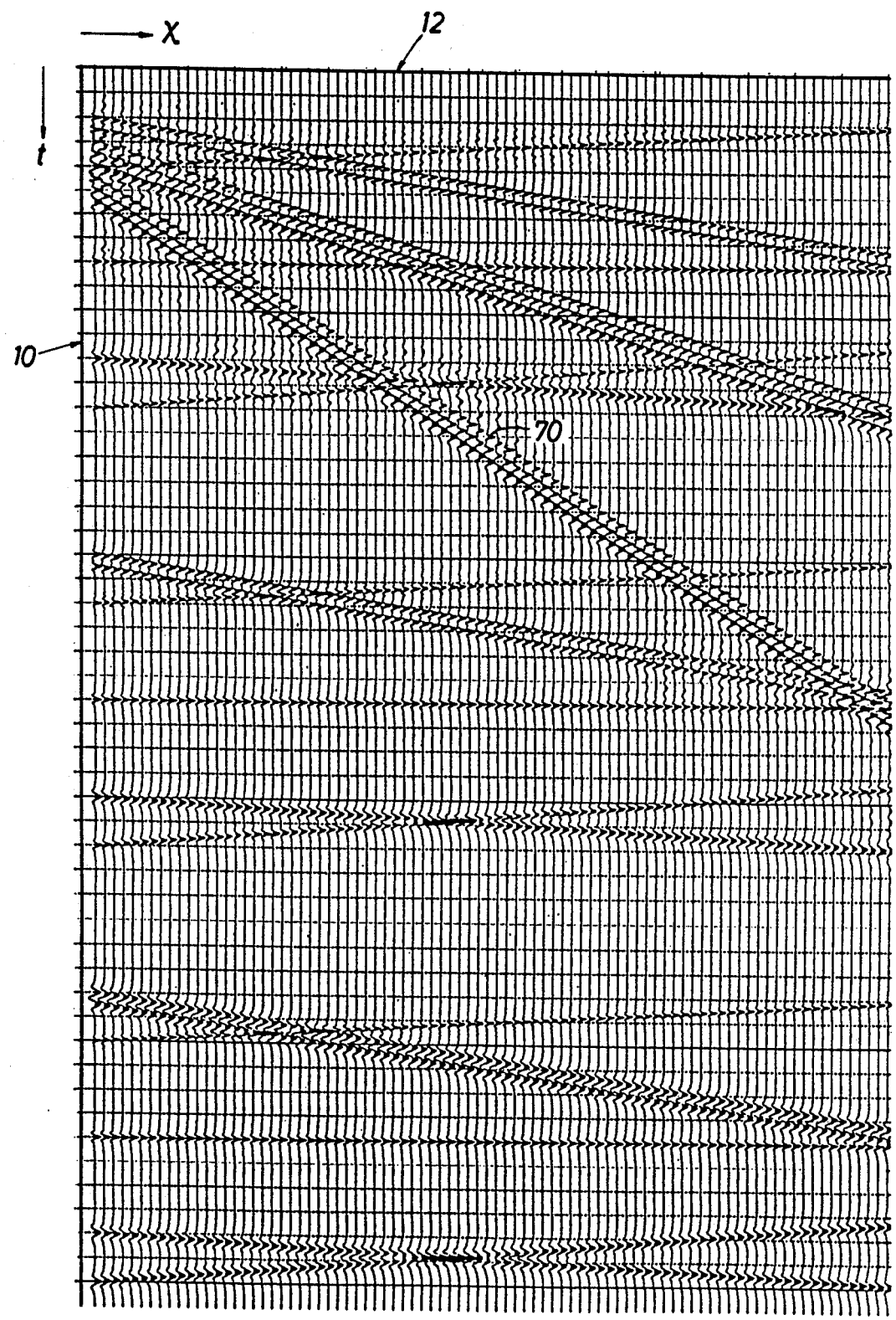
FIG. 7 is a synthetic panel of traces having interpolated traces by applying a preferred embodiment of the method of this invention to the panel of traces of FIG. 1.

FIG. 7 is an example of the result of a practice of the method of this invention used to interpolate traces. The interpolated traces of FIG. 7 are derived from FIG. 1 which is composed of synthetic traces created to test this invention. Interpolated traces are inserted on FIG. 7 between the original synthetic traces of FIG. 1 and also replace the original synthetic traces of FIG. 1. Note that the steepest dip component 70, on FIG. 1 is clearly spatial aliased at the dominant frequency, yet the method of this invention correctly interpolates this dip, 70, on FIG. 7.

In another preferred embodiment, the method of this invention can also be used to provide regularly spaced traces from irregular (non-uniform) spaced samples of recorded traces. In this embodiment, since equation (1) can be selected to produce traces at designated intervals along "x", a new panel of traces or a partial panel involving only the non-uniform spacing region can be created using equation (1) by selecting uniform spacing between traces after the selected dips and estimated dip components are known from a panel of data (traces) or sub-panel having some non-uniform spacing.

Additionally, in another preferred embodiment the method of this invention provides for trace enhancement of recorded traces. Assuming that noise is a random arrival on the traces, then each or all valid arrivals, i.e., arrivals which represent true sub-surface features can be associated with valid dips. The original panel of data (traces) traces can be enhanced by using equation (1) to create a new panel of data having the same trace spacing as the original panel of data had along the "x" axis after the selected dips and estimated dip components of the original panel of data have been determined. It should be noted that this method, although substantially reducing noise from the traces, does not eliminate all noise from the enhanced traces because some random noise will be included in the determination of the estimated dip components.

Although the present invention has been described in terms of specific embodiments, it is anticipated that alterations and modifications thereof will no doubt become apparent to those skilled in the art. It is therefore intended that the following claims be interpreted as covering all alterations and modifications as fall within the true spirit and scope of the invention.

What is claimed is:

1. A method for producing at least one interpolated seismic trace from a panel of seismic traces, the seismic traces being represented in the panel as a function of two coordinates, x and t, whereby seismic trace locations are designated along the x coordinate axis, the method comprising the steps of:
   (a) evaluating trial dips on the seismic traces in the panel of seismic traces to determine possible valid dips;
   (b) selecting a dip from the possible valid dips, the selected dip being the most valid dip in the evaluation of trial dips;
   (c) summing data on the traces in the panel of seismic traces along the selected dip and normalizing the summed data to determine an estimated dip component for the selected dip;
   (d) subtracting the estimated dip component from the seismic traces along the selected dip, thereby forming a new panel of seismic traces;
   (e) evaluating trial dips in the new panel of seismic traces to determine possible valid dips;
   (f) repeating steps (b) through (e) on each new panel of seismic traces to determine a plurality of selected dips and estimated dip components, thereby sequentially determining dips and estimated dip components from the panel of seismic traces; and
   (g) forming at least one interpolated seismic trace on the panel of seismic traces of step (a) having a selected location on the x coordinate axis, the estimated dip components being inserted along the x coordinate of the interpolated seismic trace where their corresponding selected dips cross the t coordinate of the interpolated seismic trace.

2. The method of claim 1 wherein step (f) includes repeating steps (b) through (e) on each new panel of seismic traces until the evaluation of trial dips indicates by a preselected value that there are no longer any possible valid dips of interest.

3. The method of claim 1 wherein step (f) includes repeating steps (b) through (e) a preselected number of times to determine a preselected plurality of selected dips and estimated dip components.

4. The method of claim 1 wherein:
   step (a) includes evaluating trial dips by summing data on the seismic traces along trial dips in the panel of seismic traces and estimating the energy in the sums of data to determine possible valid dips;
   step (b) includes selecting a dip, the selected dip having the maximum energy from the estimates of the energy in the sums of data as the most valid dip; and
   step (e) includes evaluating trial dips in the new panel by summing data along the trial dips and estimating the energy in the sums of data.

5. The method of claim 4 wherein step (f) includes repeating steps (b) through (e) on each new panel of seismic traces until the maximum energy in the summed data having the greatest energy is below a preselected value.

6. The method of claim 4 wherein step (f) includes repeating steps (b) through (e) a preselected number of times to determine a preselected plurality of selected dips and estimated dip components.

7. The method of claim 4 wherein:
   step (a) includes summing data on the seismic traces along a preselected set of trial dips in the panel of seismic traces;

step (b) includes interpolating the estimates of energy of step (b) and selecting a dip, the selected dip having the maximum energy from the interpolated estimates of the energy in the sums of the data along the preselected set of trial dips; and step (e) includes summing the data along a preselected set of trial dips in the new panel of seismic traces.

8. A method for producing a panel of enhanced seismic traces from a panel of seismic traces, the seismic traces being represented in the panel as a function of two coordinates, x and t, whereby seismic trace locations are designated along the x coordinate axis, the method comprising the steps of:
   (a) evaluating trial dips on the seismic traces in the panel of seismic traces to determine possible valid dips;
   (b) selecting a dip from the possible valid dips, the selected dip being the most valid dip in the evaluation of trial dips;
   (c) summing data on the traces in the panel of seismic traces along the selected dip and normalizing the summed data to determine an estimated dip component for the selected dip;
   (d) subtracting the estimated dip component from the seismic traces along the selected dip, thereby forming a new panel of seismic traces;
   (e) evaluating trial dips in the new panel of seismic traces to determine possible valid dips;
   (f) repeating steps (b) through (e) on each new panel of seismic traces to determine a plurality of selected dips and estimated dip components, thereby sequentially determining dips and estimated dip components from the panel of seismic traces; and
   (g) forming the panel of enhanced seismic traces using the selected dips and estimated dip components, the enhanced seismic traces being spaced between each other such that their locations are designated along the x coordinate axis with the estimated dip components being inserted along the x coordinate of the enhanced traces where the selected dips with their corresponding estimated dip components cross the t coordinates of the enhanced traces.

9. The method of claim 8 wherein step (f) includes repeating steps (b) through (e) on each new panel of seismic traces until the evaluation of trial dips indicates by a preselected value that there are no longer any possible valid dips of interest.

10. The method of claim 8 wherein step (f) includes repeating steps (b) through (e) a preselected number of times to determine a preselected plurality of selected dips and estimated dip components.

11. The method of claim 8 wherein:
   step (a) includes evaluating trial dips by summing data on the seismic traces along trial dips in the panel of seismic traces and estimating the energy in the sums of data to determine possible valid dips;
   step (b) includes selecting a dip, the selected dip having the maximum energy from the estimates of the energy in the sums of data as the most valid dip; and
   step (e) includes evaluating trial dips in the new panel by summing data along the trial dips and estimating the energy in the sums of data.

12. The method of claim 11 wherein step (f) includes repeating steps (b) through (e) on each new panel of seismic traces until the maximum energy in the summed data having the greatest energy is below a preselected value.

13. The method of claim 11 wherein step (f) includes repeating steps (b) through (e) a preselected number of times to determine a preselected plurality of selected dips and estimated dip components.

14. The method of claim 11 wherein:
   step (a) includes summing data on the seismic traces along a preselected set of trial dips in the panel of seismic traces;
   step (b) includes interpolating the estimates of energy of step (b) and selecting a dip, the selected dip having the maximum energy from the interpolated estimates of the energy in the sums of the data along the preselected set of trial dips; and
   step (e) includes summing the data along a preselected set of trial dips in the new panel of seismic traces.

15. A method for providing a panel of uniformly spaced seismic traces from a panel of seismic data traces having at least some non-uniform spacing between the seismic traces, the seismic traces being represented in the panel as a function of two coordinates, x and t, such that seismic trace locations are designated on the x coordinate axis and there is at least some non-uniform spacing between the locations, the method comprising the steps of:
   (a) summing data on the traces along trial dips in the panel of seismic traces having at least some non-uniform spacing and estimating the energy in the sums of data;
   (b) interpolating and selecting a dip, the selected dip having the maximum energy from the estimates of the energy in the sums of the data;
   (c) normalizing the summed data of the selected dip to determine an estimated dip component for the selected dip;
   (d) subtracting the estimated dip component from the traces along the selected dip, thereby forming a new panel of seismic traces having at least some non-uniform spacing;
   (e) summing the data along trial dips in the new panel of seismic traces and estimating the energy in the sums of the data;
   (f) repeating steps (b) through (e) on each new panel of seismic traces to determine a plurality of selected dips and estimated dip components; and
   (g) forming the panel of uniformly spaced seismic traces using the selected dips and estimated dip components, the uniformly spaced seismic traces being located on the x coordinate axis at selected uniform spacing between each seismic trace, the estimated dip components being inserted along the x coordinate of the uniformly spaced seismic traces where the selected dips with their corresponding estimated dip components cross the t coordinates of the uniformly spaced seismic traces.

16. The method of claim 15 wherein step (f) includes repeating steps (b) through (e) on each new panel of seismic traces until the evaluation of trial dips indicates by a preselected value that there are no longer any possible valid dips of interest.

17. The method of claim 15 wherein step (f) includes repeating steps (b) through (e) a preselected number of times to determine a preselected plurality of selected dips and estimated dip components.

18. The method of claim 15 wherein:

step (a) includes evaluating trial dips by summing data on the seismic traces along trial dips in the panel of seismic traces and estimating the energy in the sums of data to determine possible valid dips;

step (b) includes selecting a dip, the selected dip having the maximum energy from the estimates of the energy in the sums of data as the most valid dip; and step (e) includes evaluating trial dips in the new panel by summing data along the trial dips and estimating the energy in the sums of data.

19. The method of claim 18 wherein step (f) includes repeating steps (b) through (e) on each new panel of seismic traces until the maximum energy in the summed data having the greatest energy is below a preselected value.

20. The method of claim 18 wherein step (f) includes repeating steps (b) through (e) a preselected number of times to determine a preselected plurality of selected dips and estimated dip components.

21. The method of claim 18 wherein:

step (a) includes summing data on the seismic traces along a preselected set of trial dips in the panel of seismic traces having at least some non-uniform spacing;

step (b) includes interpolating the estimates of energy of step (b) and selecting a dip, the selected dip having the maximum energy from the interpolated estimates of the energy in the sums of the data along the preselected set of trial dips; and step (e) includes summing the data along a preselected set of trial dips in the new panel of seismic traces.

22. A method for producing at least one interpolated seismic trace from a panel of seismic traces, comprising the steps of:

(a) isolating within a sub-panel portions of seismic traces from the panel of seismic traces;

(b) evaluating trial dips on the portions of seismic traces within the sub-panel to determine possible valid dips;

(c) selecting a dip from the possible valid dips, the selected dip being the most valid dip in the evaluation of dips;

(d) summing data on the portions of seismic traces in the sub-panel along the selected dip and normalizing the summed data to determine an estimated dip component for the selected dip;

(e) substracting the estimated dip component from the portions of seismic traces along the selected dip, thereby forming a new sub-panel;

(f) evaluating trial dips in the new sub-panel to determine possible valid dips in the new sub-panel;

(g) repeating steps (c) through (f) on each new sub-panel to determine a plurality of selected dips and estimated dip components;

(h) forming a completed sub-panel having at least one interpolated portion of a seismic trace at a selected location for each desired interpolated portion of a seismic trace among the portions of seismic traces isolated by the boundaries of the sub-panel of step (b), the determined estimated dip components being inserted on at least one of the portions of interpolated seismic trace where the selected dips with their corresponding estimated dip components cross the selected location for that portion of an interpolated seismic trace, the completed sub-panel replacing the portions of seismic traces of the sub-panel of step (b) in the panel of seismic traces;

(i) moving the boundaries of the sub-panel to again isolate and encompass portions of seismic traces from the panel of seismic traces, the new position of the sub-panel forming an overlap region when the boundaries of the sub-panel of this step overlap at least one previously completed sub-panel, the overlap region being the shared portions of seismic traces between the present sub-panel and at least one previously completed sub-panel;

(j) repeating steps (b) through (h);

(k) repeating steps (i) and (j) until the panel of seismic traces has been processed; and (l) identifying the overlap regions and merging the interpolated portions of seismic traces within the overlap regions so that a single interpolated seismic trace is formed for each selected interpolated trace position.

23. The method of claim 22 wherein step (g) includes repeating steps (c) through (f) on each new sub-panel until the evaluation of trial dips indicates by a preselected value that there are no longer any possible valid dips of interest.

24. The method of claim 22 wherein step (g) includes repeating steps (c) through (f) a preselected number of times to determine a preselected plurality of selected dips and estimated dip components.

25. The method of claim 22 wherein:

step (b) includes evaluating trial dips by summing data on the portions of seismic traces along trial dips in the sub-panel and estimating the energy in the sums of data to determine possible valid dips;

step (c) includes selecting a dip having the maximum energy from the estimates of the energy in the sums of data as the most valid dip; and step (f) includes evaluating trial dips in the new sub-panel by summing data along the trial dips and estimating the energy in the sums of data.

26. The method of claim 25 wherein step (g) includes repeating steps (c) through (f) on each new sub-panel until the maximum energy on the summed data having the greatest energy is below a preselected value.

27. The method of claim 25 wherein step (g) includes repeating steps (c) through (f) a preselected number of times to determine a preselected number of selected dips and estimated dip components.

28. The method of claim 25 wherein:

step (b) includes summing data on the portions of seismic traces along a preselected set of trial dips;

step (c) includes interpolating the estimates of energy of step (b) and selecting a dip, the selected dip having the maximum energy from the interpolated estimates of the energy in the sums of the data; and step (f) includes summing the data along a preselected set of trial dips.

29. A method for producing a panel of enhanced seismic traces from a panel of seismic traces, comprising the steps of:

(a) isolating within a sub-panel portions of seismic traces from the panel of seismic traces;

(b) evaluating trial dips on the portions of seismic traces within the sub-panel to determine possible valid dips;

(c) selecting a dip from the possible valid dips, the selected dip being the most valid dip in the evaluation of dips;

(d) summing data on the portions of seismic traces in the sub-panel along the selected dip and normalizing the summed data to determine an estimated dip component for the selected dip;

(e) subtracting the estimated dip component from the portions of seismic traces along the selected dip, thereby forming a new sub-panel;

(f) evaluating trial dips in the new sub-panel to determine possible valid dips;

(g) repeating steps (c) through (f) on each new sub-panel to determine a plurality of selected dips and estimated dip components;

(h) forming a completed sub-panel of enhanced portions of seismic traces using the selected dip and estimated dip components, the enhanced portions of seismic traces having the same locations on the completed sub-panel of enhanced portions of seismic traces as the locations of the portions of seismic traces used to determine the selected dips and estimated dip components, the estimated dip components being inserted on the portions of enhanced seismic traces where their corresponding selected dips cross the locations for the enhanced portions of seismic traces, the completed sub-panel replacing the portions of seismic traces of sub-panels of step (b) in the panel of seismic traces;

(i) moving the boundaries of the sub-panel to again isolate and encompass portions of seismic traces from the panel of seismic traces, the new position of the sub-panel forming an overlap region when the boundaries of the sub-panel of this step overlap at least one previously completed sub-panel, the overlap region being, the shared portions of seismic traces between the present sub-panel and at least one previously completed sub-panel;

(j) repeating steps (b) through (h);

(k) repeating steps (i) and (j) until the panel of seismic traces has been processed; and (l) identifying the overlap regions and merging the enhanced portions of seismic traces within the overlap regions so that on the panel of enhanced seismic traces a single enhanced seismic trace is formed for each selected enhanced seismic trace position.

30. The method of claim 29 wherein:

step (b) includes evaluating trial dips by summing data on the portions of seismic traces along the trial dips in the sub-panel and estimating the energy in the sums of data to determine possible valid dips;

step (c) includes selecting a dip having the maximum energy from the estimates of the energy in the sums of data as the most valid dip; and step (f) includes evaluating trial dips in the new sub-panel by summing data along the trial dips and estimating the energy in the sums of data.

31. A method for providing a panel of uniformly spaced seismic traces from a panel of seismic traces having at least some non-uniform spacing between the seismic traces, comprising the steps of:

(a) isolating within a sub-panel portions of seismic traces from the panel of seismic traces;

(b) evaluating trial dips on the portions of seismic traces within the sub-panel to determine possible valid dips;

(c) selecting a dip from the possible valid dips, the selected dip being the most valid dip in the evaluation of dips;

(d) summing data on the portions of seismic traces in the sub-panel along the selected dip and normalizing the summed data to determine an estimated dip component for the selected dip;

(e) subtracting the estimated dip component from the portions of seismic traces along the selected dip, thereby forming a new sub-panel;

(f) evaluating trial dips in the new sub-panel to determine possible valid dips for the new sub-panel;

(g) repeating steps (c) through (f) on each new sub-panel to determine a plurality of selected dips and estimated dip components;

(h) forming a completed sub-panel of portions of seismic traces having a selected uniform spacing between the new portions of seismic traces using the selected dips and estimated dip components, the estimated dip components being inserted at the selected uniform locations for the new portions of seismic traces where each of the selected dips with their corresponding estimated dip component crosses the selected location for each new uniformly spaced portion of seismic trace, the completed sub-panel replacing the portions of seismic traces of the sub-panel of step (b) in the panel of seismic traces;

(i) moving the boundaries of the sub-panel to again isolate and encompass portions of seismic traces from the panel of seismic traces, the new position of the sub-panel forming an overlap region when the boundaries of the sub-panel of this step overlap at least one previously completed sub-panel, the overlap region being the shared portions of seismic traces between the present sub-panel and at least one completed sub-panel;

(j) repeating steps (b) through (h);

(k) repeating steps (i) and (j) until the panel of seismic traces has been processed; and (l) identifying the overlap regions and merging the portions of seismic traces having uniform spacing within the overlap regions so that on the completed panel of uniformly spaced seismic traces a single uniformly spaced seismic trace is formed for each of the uniformly spaced locations.

32. The method of claim 31 wherein:

step (b) includes evaluating trial dips by summing data on the portions of seismic traces along dips in the sub-panel and estimating the energy in the sums of data to determine possible valid dips;

step (c) includes selecting a dip having the maximum energy from the estimates of the energy in the sums of data as the most valid dip; and step (f) includes evaluating trial dips in the new sub-panel by summing data along the trial dips and estimating the energy in the sums of data.

* * * * *